Z. L. Bragdon,
Sewer Grate.
No. 101,575.      Patented Apr. 5, 1870.

Witnesses
E. W. Anderson
D. D. Kane

Inventor
Z. L. Bragdon
Chipman, Hosmer & Co.
Attorneys.

United States Patent Office.

ZEBINA L. BRAGDON, OF BANGOR, MAINE.

Letters Patent No. 101,575, dated April 5, 1870.

IMPROVED SEWER-GRATE

The Schedule referred to in these Letters Patent and making part of the same.

*To all whom it may concern:*

Be it known that I, ZEBINA L. BRAGDON, of Bangor, in the county of Penobscot and State of Maine, have invented a new and valuable Improvement in Sewer-Grate; and do hereby declare that the following is a full, clear, and exact description of the construction and operation of the same, reference being had to the annexed drawings making a part of this specification, and to the letters and figures of reference marked thereon.

Figure 1 of the drawing is a representation of the outer frame of the grate.

Figure 1:
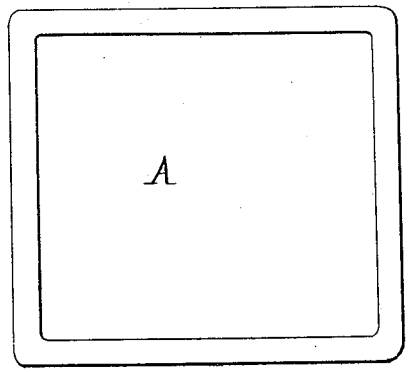

My invention relates to grates for the openings over street-sewers and

It consists in constructing the cross-bars of such grates with an upward curve, and splitting and welding such bars to the frame in a new and useful manner.

A in the drawing represents the frame of a grate, and

Figure 2:
Figure 2 is a view of cross-bar, showing the ends split before welding.
Figure 3:
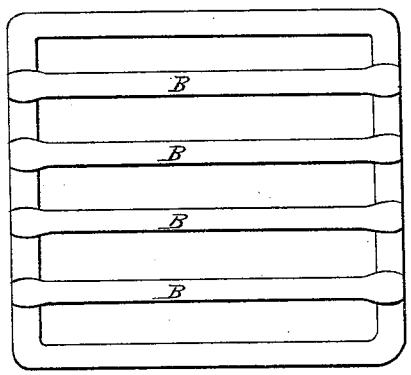
Figure 3 is a top view of the grate.
Figure 4:
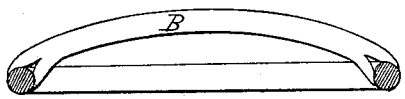
Figure 4 is a sectional view of the same.

B, the cross-bars thereof, bent or curved upward, as shown on fig. 2.

When the bars of the grate are thus curved, the sewer is protected, to a great extent, from sticks, stones, and the like, and no large amount of matter can collect upon the bars, so as to prevent a free passage of water therethrough.

In constructing these grates, I first form the frame, and then, after forming and curving the bars, I split them open at each end until jaws are formed of sufficient capacity to clasp the frame. I pass these jaws respectively over the frame while red hot, and weld them firmly thereto. This welding may also be effected when the iron is cold, but it is done best and most rapidly under a proper degree of heat.

This method of manufacture furnishes ready means of supplying a broken or worn-out bar, and is in other respects an improvement over the ordinary method.

What I claim as my invention, and desire to secure by Letters Patent, is—

The grate for sewers herein described, constructed with curved bars of wrought iron welded to the frame, as specified.

In testimony that I claim the above, I have hereunto subscribed my name in the presence of two witnesses.

ZEBINA L. BRAGDON.

Witnesses:
DANIEL SMITH, Jr.,
JOSEPH RICHARDSON.